United States Patent [19]

Onaka et al.

[11] Patent Number: 5,047,940
[45] Date of Patent: Sep. 10, 1991

[54] POWER TRAIN CONTROL APPARATUS FOR A VEHICLE

[75] Inventors: Toru Onaka; Toshiaki Tsuyama; Kazutoshi Nobumoto; Fumio Kageyama; Akira Sone; Makoto Teshima, all of Hiroshima, Japan

[73] Assignee: Mazda Motor Corporation, Hiroshima, Japan

[21] Appl. No.: 362,869

[22] Filed: Jun. 7, 1989

[30] Foreign Application Priority Data

Jun. 7, 1988 [JP] Japan ................................. 63-141249
Jan. 25, 1989 [JP] Japan ..................................... 1-15553

[51] Int. Cl.$^5$ .......................... B60T 8/58; B60K 13/02
[52] U.S. Cl. ................................ 364/426.02; 180/197; 364/424.1; 364/426.03
[58] Field of Search ....................... 364/426.02, 426.03, 364/424.1; 180/197; 361/238; 303/95, 96, 99, 100, 106, 109, 111

[56] References Cited

U.S. PATENT DOCUMENTS

| | | | |
|---|---|---|---|
| 4,484,280 | 11/1984 | Brugger et al. | 364/426.03 |
| 4,583,611 | 4/1986 | Frank et al. | 180/197 |
| 4,825,367 | 4/1989 | Nagaoka et al. | 364/426.03 |
| 4,843,552 | 6/1989 | Inagaki | 364/426.03 |
| 4,866,618 | 9/1989 | Tamura et al. | 364/426.03 |
| 4,873,639 | 10/1989 | Sato et al. | 364/426.02 |

Primary Examiner—Felix D. Gruber
Attorney, Agent, or Firm—Fish & Richardson

[57] ABSTRACT

Slip control is carried out so as to reduce torque applied to the driven wheels by reducing torque generated by the engine when a slip value against the driven wheels on pavement is larger than a predetermined value. A shift characteristic of the automatic transmission interposed between the engine and the driven wheels is set as a first shift characteristic which is a basic characteristic at the time of ordinary running where no slip control is carried out and as a second shift characteristic set so as to become at least unlikely to cause downshifting during slip control compared with said first shift characteristic. As the slip control terminates, a return of the first shift characteristic is prohibited when the torque generated by the engine is large (for example, when a degree of operation of an accelerator is not zero) or when downshifting is caused if based on the first shift characteristics.

24 Claims, 16 Drawing Sheets

FUNCTIONAL BLOCK DIAGRAM

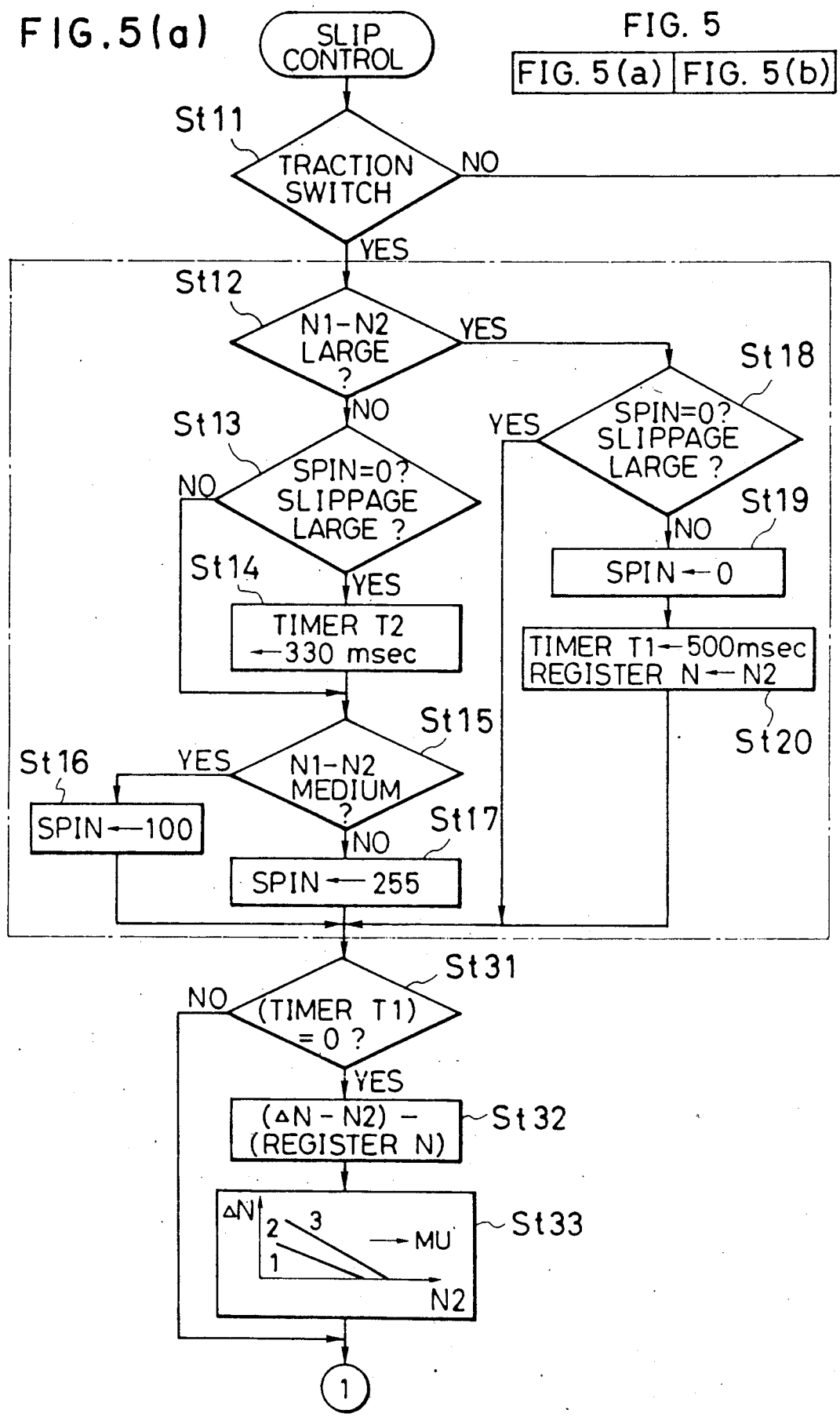

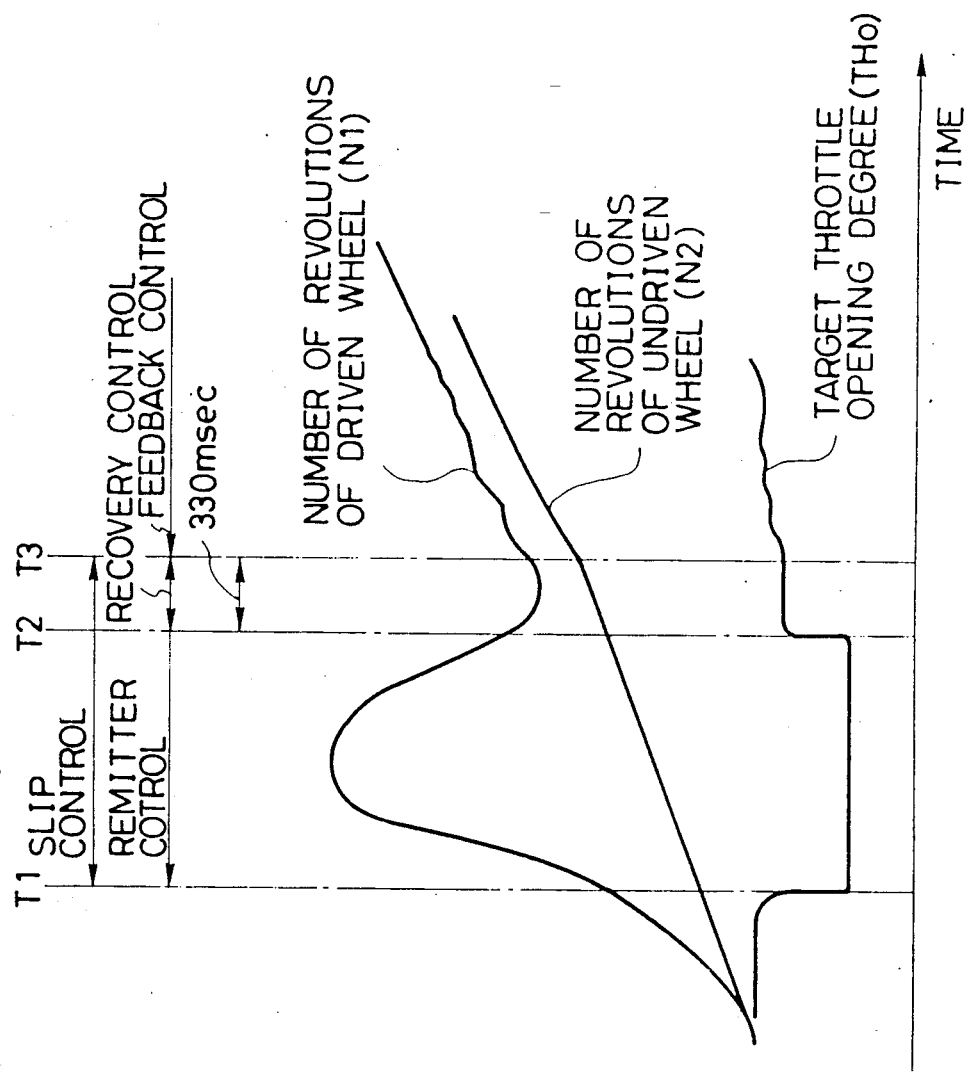

POWER TRAIN CONTROL APPARATUS FOR A VEHICLE

BACKGROUND OF THE INVENTION

1. Field of the Invention

The present invention relates to a power train control apparatus of a vehicle and, more particularly, to slip control of a vehicle equipped with an automatic transmission.

2. Description of Related Art

Preventing the driven wheels from slipping on the pavement to an excessive extent is advisable to produce an efficient driving force for the automobile or to ensure safety by preventing spin-out of the automobile. An excessive amount of slippage of the driven wheels can be prevented by reducing the torque applied to the driven wheels, as such torque becomes a cause of slippage.

A slip control of this kind—which is sometimes called a traction control—is disclosed, for example, in U.S. Pat. Nos. 4,484,280 and 4,583,611 as well as their Japanese counterparts, i.e., Japanese Patent Publication Laid-open Nos. 16,948/1983 and 56,662/1985. The technology disclosed in these two prior patent publications involves a reduction in torque applied to the driven wheels by a decrease in output of the engine itself as well as by the application of a braking force to the driven wheels by the brake. More specifically, U.S. Pat. No. 4,484,280 and its Japanese counterpart, Japanese Patent Publication Laid-open No. 16,948/1983, disclose the technology in which the driven wheels are braked only when the extent of slippage of the driven wheels is small while output of the engine is decreased, in addition to the braking of the driven wheels, when slippage becomes larger. U.S. Pat. No. 4,583,611 and its Japanese counterpart, Japanese Patent Publication Laid-open No. 56,662/1985, disclose the technology which involves braking only the one side of the driven wheels which slips more than the other when the driven wheels slip to different extents while decreasing the output of the engine in addition to the braking of both sides of the driven wheels when both sides slip to a large extent.

Furthermore, there is recently the increasing tendency that the output of the engine is transmitted to the driven wheels through a multistage automatic transmission. Japanese Patent Publication Laid-open No. 176,828/1985 discloses a vehicle equipped with such a multistage automatic transmission, in which the gearing ratio is upshifted to high speed stages in synchronization with the start of the slip control. This system is such that efficiency in slip convergence is enhanced by the reduction in output of the engine or by the application of a braking force because the torque applied to the driven wheels is reduced by upshifting.

Japanese Patent Publication Laid-open No. 106,160/1987 proposes a correction of shift characteristics so as to allow the high speed range to be increased gradually when a non-slip control state is transferred to a slip control state while the shift characteristics corrected is gradually returned to an orginal level when the slip control state is changed to the non-slip control state.

It should be noted that the upshifting or changing of the shift characteristics on condition of the start of the slip control may give rise to or incur the risk of downshifting as the slip control is terminated. The automatic transmission is operated to provide an automatic transmission of rotational power on the basis of predetermed shift characteristics so that the upshifting on condition of the start of the slip control leads to a forcible change of the shift characteristics during ordinary running. Accordingly, when the slip control has been terminated, the shift characteristics are switched back to those employed during ordinary running, so it can be considered that this switching backcauses downshifting. This downshifting again increases the torque applied to the driven wheels. Thus there is room for improvement from the point of view of slip convergence.

SUMMARY OF THE INVENTION

The present invention has the object to provide a power train control apparatus with an automatic transmission, adapted to prevent recurrence of slippage upon termination of slip control, which is provided with shift characteristics for ordinary running and with shift characteristics for slip control.

In order to achieve this object, the present invention consists of a power train control apparatus of a vehicle adapted to transmit the output of an engine to a driven wheel through an automatic transmission for shifting speed stages based on a given shift characteristic, which comprises a slip detecting means for detecting a degree of slippage, or a slip value, of the driven wheel on pavement; a slip control means for controlling the degree of slippage by reducing the torque applied to the driven wheel in response to output from said slip control means when the degree of slippage is large enough to be reduced by slip control; a shift-characteristics changing means for changing said given shift characteristic, said shift characteristic comprising a first shift characteristic and a second shift characteristic, in a manner such that said first shift characteristic is used at the time of ordinary running when no slip control is carried out by said slip control means and said second shift characteristic is used when slip control is carried out by said slip control means; a running-state detecting means for detecting a given running state in which the running state of the vehicle is preset; and a regulation means for regulating the return of said second shift characteristic to said first shift characteristic when said given running state is detected by said running-state detecting means as slip control by said slip control means terminates.

The condition for regulating a return to the first shift characteristic for ordinary running from the second shift characteristic for slip control, i.e., the given driving state, is set on the possibility that a large amount of slippage may re-occur attendant upon the switching of shift characteristics. The recurrence of such a large amount of slippage is possible in the case that, firstly, the torque generated by the engine is large—more specifically, for example, the degree of opening of the accelerator is not zero because the accelerator is opened—and, secondly, the downshifting occurs as the shift control is implemented on the basis of the first shift characteristics.

The the first shift characteristics used are those have been conventionally used and which may be formed preferably using an engine load and a vehicle speed as parameters. The second shift characteristics which are preferably used are those which are unlikely to cause the shifting of speed stages attendant upon the slip control. Thus, the second shift characteristics may be set as shift characteristics in which the high speed range is larger than in the first shift characteristics. in which the degree of opening of the accelerator and the vehicle speed are used as parameters—particularly, the vehicle speed is preferably set as the rotational velocity of an undriven wheel—and in which only the vehicle speed is used as a parameter.

BRIEF DESCRIPTION OF THE DRAWINGS

Other objects, features and advantages of the present invention will become apparent in the course of the description of the preferred embodiments which follows, when interpreted in the light of the accompanying drawings, in which:

FIGS. 5(a) and 5(b) are flowcharts which together show one example of the slip control;

FIG. 6 is an explanation diagram showing the slip control;

FIGS. 10 to 19 relate to the third embodiment according to the present invention; wherein:

FIG. 10 is a control system diagram;

FIG. 11 is a circuit diagram showing the construction and disposition of braking pressure control valves and their actuators;

FIG. 12 is a flowchart showing a main program of a control operation of a control unit;

FIG. 13 is a characteristic diagram showing the relationship of friction coefficient to slip ratio to be used for determination of occurrence of slippage in this type of slip control;

FIG. 14 is a flowchart showing a sub-program for throttle control;

FIG. 15 is a characteristic diagram showing the relationship of the accelerator opening degree to throttle opening degree to be used for throttle control;

FIG. 16 is a flowchart showing a sub-program for slip control;

FIG. 17 is an explanation diagram of a map of target slip ratios to be used for the slip control;

FIG. 18 is a flowchart showing a sub-program of shift control; and

FIG. 19 is an explanation diagram of a map for shifting speed stages to be used for the shift control.

DETAILED DESCRIPTION OF THE PREFERRED EMBODIMENTS

The present invention will be described more in detail in conjunction with the accompanying drawings.

OUTLINE

Figure 1:
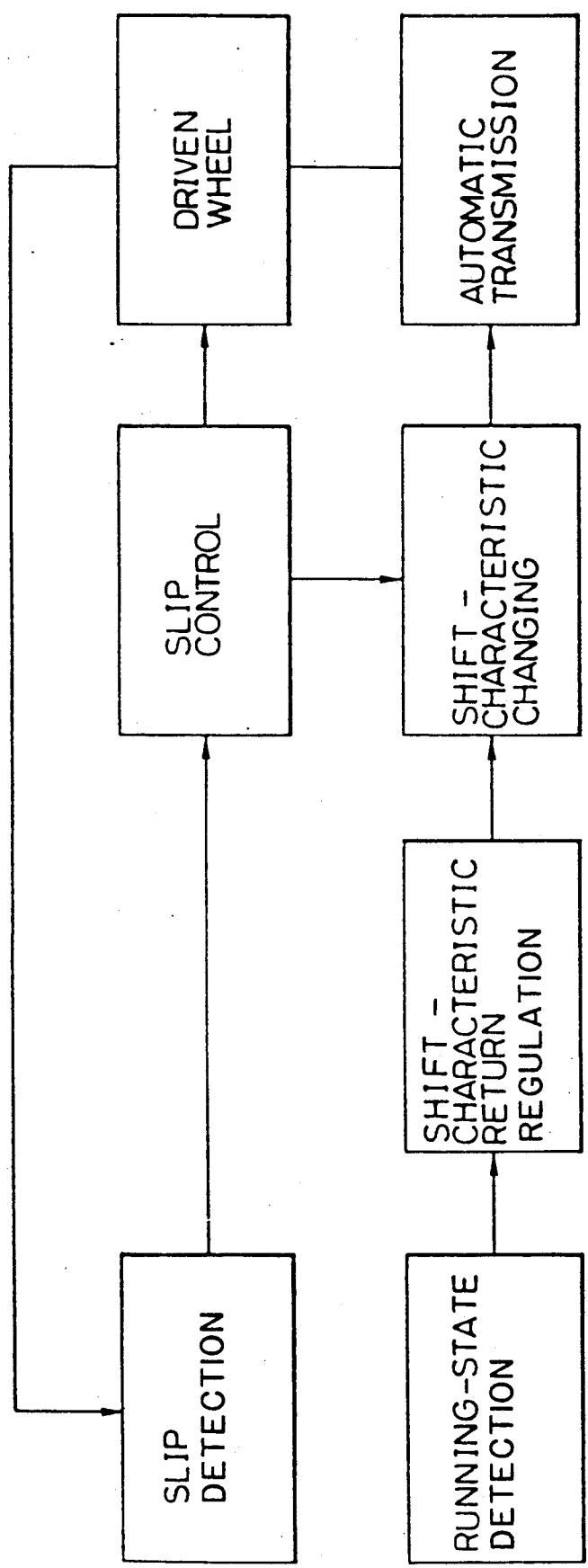
FIG. 1 is a functional block diagram showing an overall outline of elements of the present invention.
Figure 2:
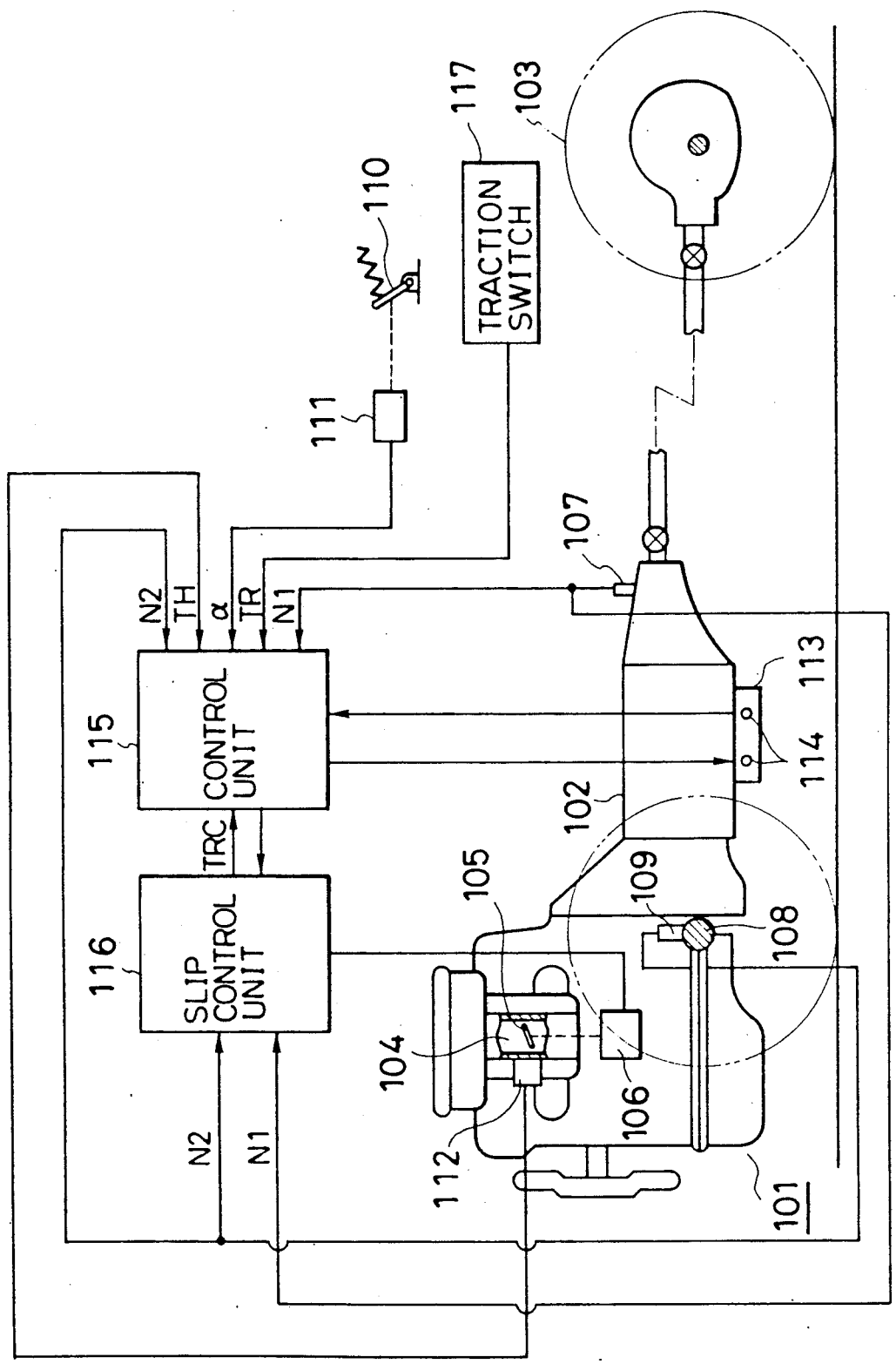
FIG. 2 is a schematic diagram showing an overall system of one example of the present invention.

Referring to FIG. 2 indicating an apparataus relating to the first embodiment according to the present invention, the apparatus is shown to be installed in a vehicle of the rear wheel drive type in which an engine 101 is mounted at a forward portion of the vehicle body and output of the engine 101 is transmitted to the rear driven wheels 103 through an automatic transmission 102 equipped with a multistage transmission mechanism. The engine 101 is provided with an air intake tube 104 for feeding intake air to its combustion chamber and the air intake tube 104 is mounted with a throttle valve 105 which, in turn, is drivable by an actuator 106 including a stepping motor or the like. An output shaft of the automatic transmission 102 is mounted with a speed sensor 107 for sensing the number of revolutions, N1, of the output shaft and front undriven wheels 108 are mounted with a speed sensor 109 for sensing the rotational velocity, N2, of the front undriven wheels 108. On a floor portion forward of a driver's seat is disposed an accelerator pedal 110. The amount, $\alpha$, of operation of the accelerator pedal 110 is detected by a sensor 111 for sensing an accelerator opening degree. The degree, TH, of opening of the throttle valve 105 is detected by a throttle sensor 112. The automatic transmission 102 is provided with a hydraulic pressure control circuit 113 of an electromagnetic type for controlling speed stages and a lockup clutch, and the switching to a desired speed stage and the lockup may be implemented by turning on or off a solenoid valve 114 incorporated in the hydraulic pressure control circuit 113.

Figure 9:
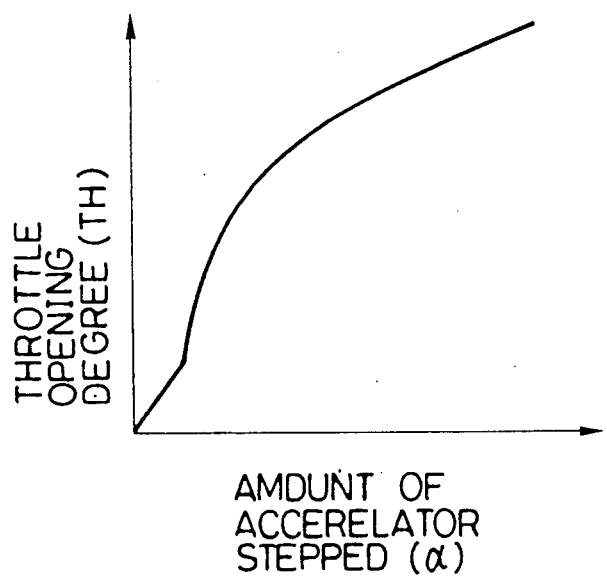
FIG. 9 is a diagram showing characteristic of a throttle valve during ordinary running.

The automatic transmission 102 may be controlled by a control unit 115 composed of, for example, a one-chip microcomputer. On the input side of the control unit 115 are provided signals representing the number of revolutions N1, the velocity N2, the accelerator opening degree $\alpha$, and the throttle opening degree TH from the corresponding sensors. In order to allow for the driver's discretion so as to judge whether slip control is advisable or not in such a manner as will be described hereinbelow, a traction switch 117 is disposed at the driver's seat which generates an ON/OFF signal to the control unit 115. The control unit 115 implements the control of the engine 101 and a shift control of the automatic transmission 102 on the basis of these input data. In this embodiment, there is disposed a slip control unit 116 into which the number of revolutions N1 and the velocity N2 are input, so that it is capable of detecting the occurrence of slippage on the driven wheels 103 on the basis of these values. When the occurrence of slippage is detected, the slip control is implemented on condition that the traction switch 117 is turned on, thus controlling the degree of opening of the throttle valve 105 so as to reach a target degree of throttle opening predetermined by this control. The slip control unit 116 controls the degree of opening of the throttle valve 105 in response to a signal from the accelerator opening sensor 111 which is input directly or through the control unit 115, when no slip control is implemented, with reference to the characteristics of the relationship of the amount $\alpha$ of operation of the accelerator pedal to the throttle opening degree TH as shown in FIG. 9. The slip control unit 116 feeds to the control unit 115 a signal TRC indicative of whether or not the slip control is implemented.

OPERATION OF SHIFT CONTROL

Change of Shift Characteristics

Figure 3:
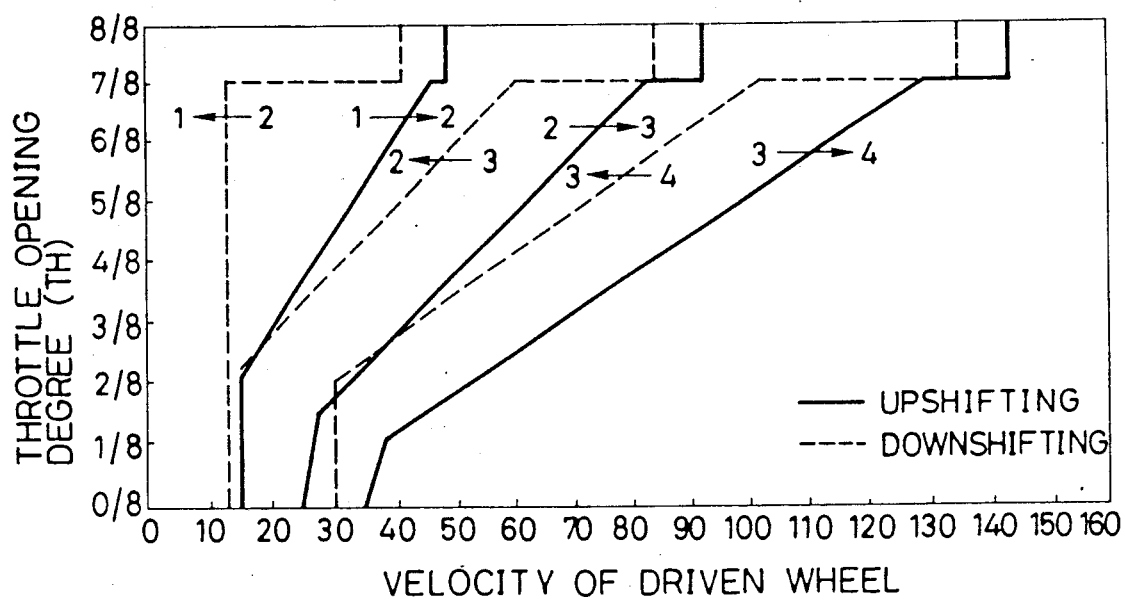
FIG. 3 is a diagram showing a map of shift characteristics for ordinary running.
Figure 4:
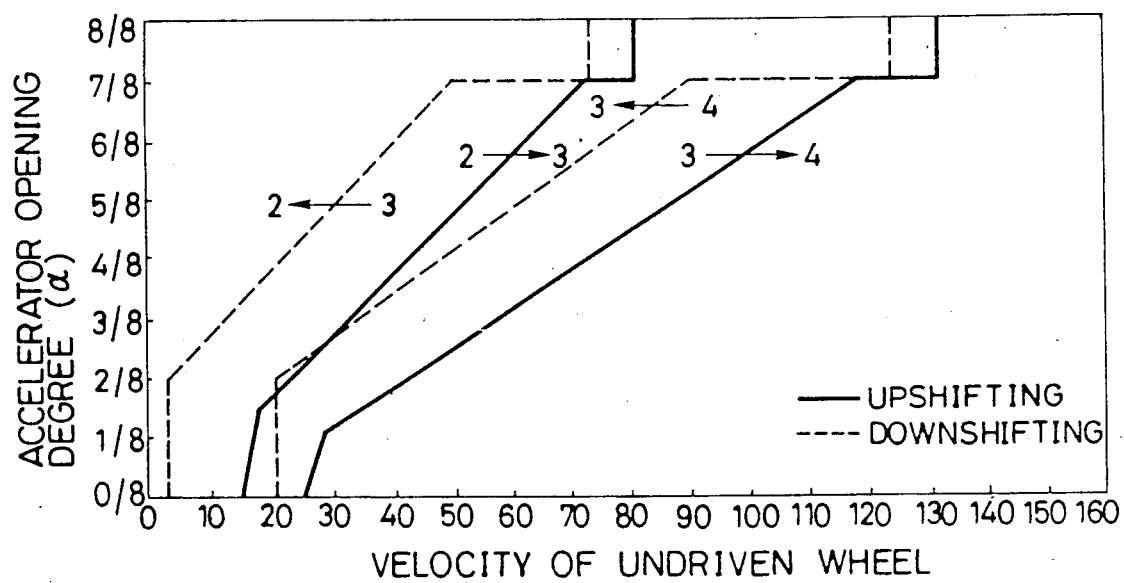
FIG. 4 is a diagram showing a map of shift charactristics for the slip control.

FIGS. 3 and 4 show the shift patterns and characteristics to be used for operation of the shift control by the apparatus according to the present invention. FIG. 3 shows shift patterns in the speed range D during ordinary running. At the time of ordinary running, in other words, in a normal shift mode where the driven wheels cause no slippage so that no slip control is implemented, on the one hand, the shift control is implemented on the basis of the number N1 of revolutions of the driven wheels 103 and the throttle opening degree TH in accordance with the shift patterns or shift characteristics as shown in FIG. 3. In the slip control mode, in which the slip control is implemented on account of occurrence of slippage on the driven wheels, on the other hand, the shift control is implemented on the basis of the shift patterns or shift characteristics shown in FIG. 4. As will be apparent from the shift characteristic patterns for slip control as shown in FIG. 4 compared with the normal shift characteristics as shown in FIG. 3, the shift characteristics for the slip control are shown in which the range of the high speed stage is extended to be wider than the high speed stage in ordinary running. Furthermore, no range is given to a first speed stage as the lowest speed stage so that the speed stage is not set at the first speed stage. In the slip control mode, speed stages are shifted using the velocity, i.e., the number of revolutions N2, of the undriven wheels and the accelerator opening degree α as parameters. This is to prevent the shifting of speed stages attendant upon slip control. Using the accelerator's opening degree α as a parameter is based on the fact that, if the slip control is to be implemented by adjusting the output of the engine, the shifting of speed stages is likely to occur upon a change of the throttle opening degree TH when a factor relating to the engine output such as the throttle opening degree TH is used as a parameter for shifting and, furthermore, that the shifting is likely to occur again upon the slip control on the driven wheels as the result of a variation in torque applied to the driven wheels attendant upon the shifting, thus incurring the risk of causing frequent repetition of upshifting and downshifting on account of the interaction of the slip control with the shifting of the speed stages. Using the rotational velocity of the undriven wheels as a parameter is based on the fact that the control over the shifting on the basis of the rotational velocity of the driven wheels, when a slippage occurs, increases the velocity (number of revolutions) of the driven wheels attendant upon the occurrence of slippage, thus upshifting the speed stages, on the one hand, and to decrease the velocity of the driven wheels attendant upon the reduction of slippage, thus downshifting them, on the other hand. This may cause unnecessary shifting.

OPERATION OF SLIP CONTROL

Figure 5B:
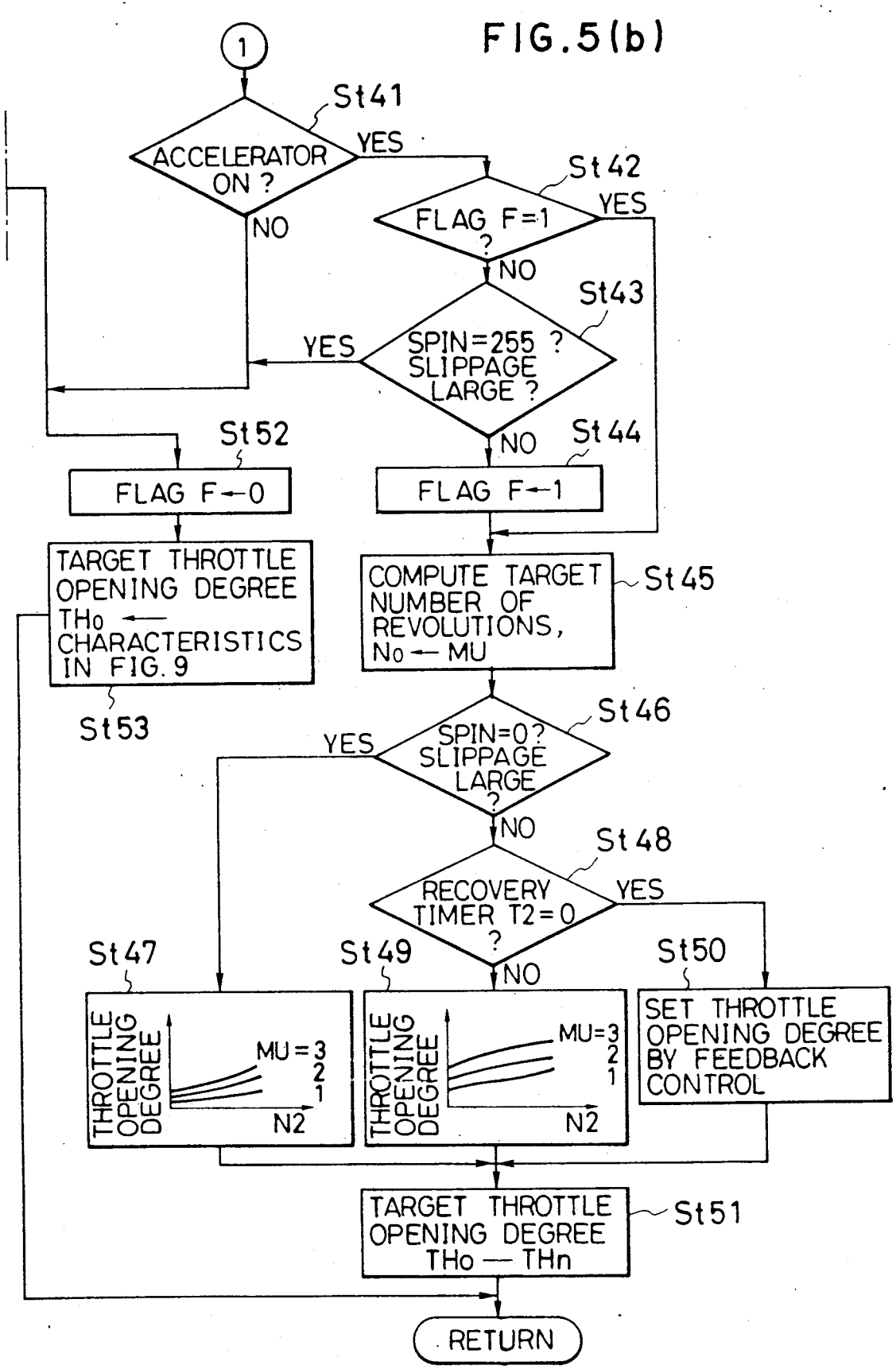
Figure 7:
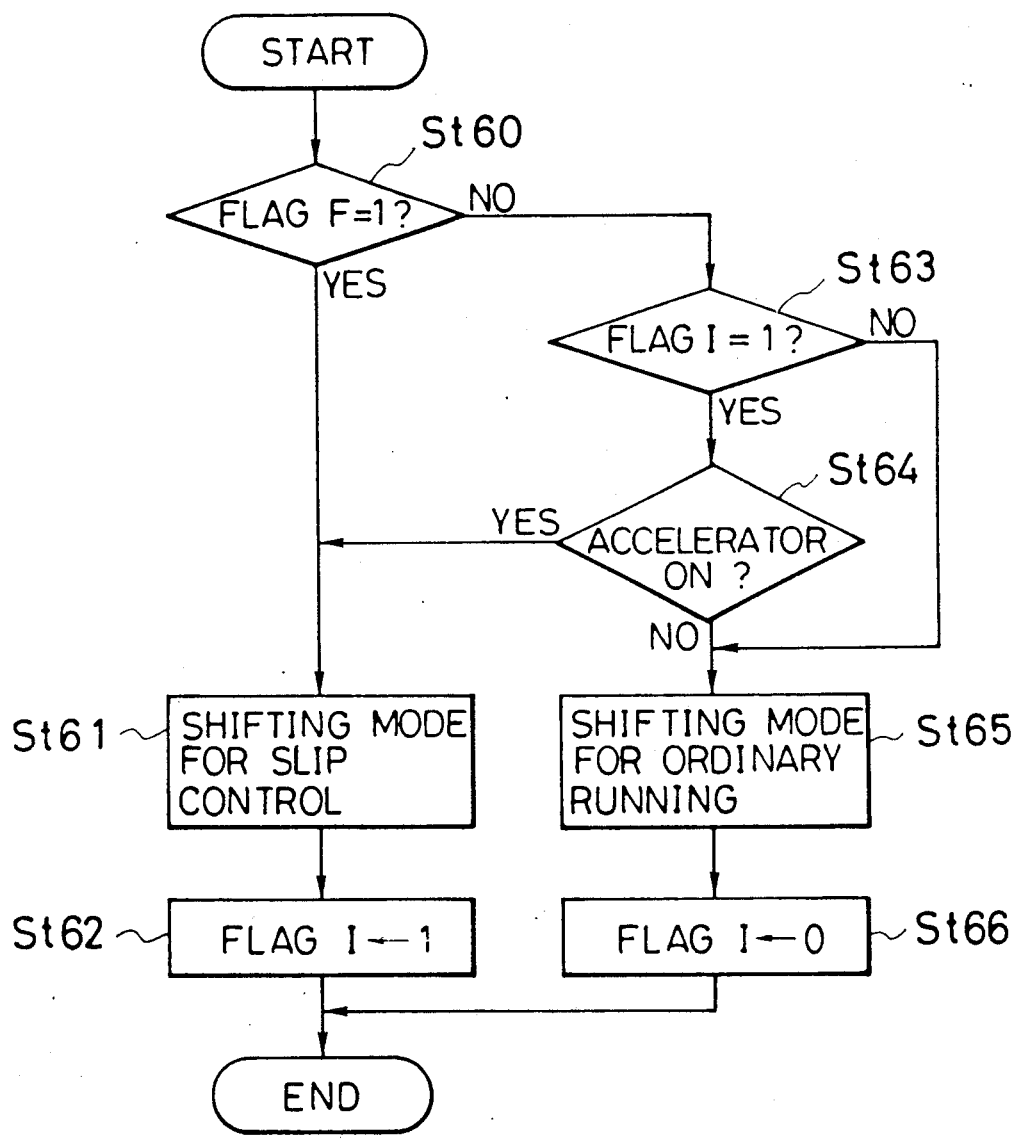
FIG. 7 is a flowchart showing one example of changing shift characteristics.
Figure 8:
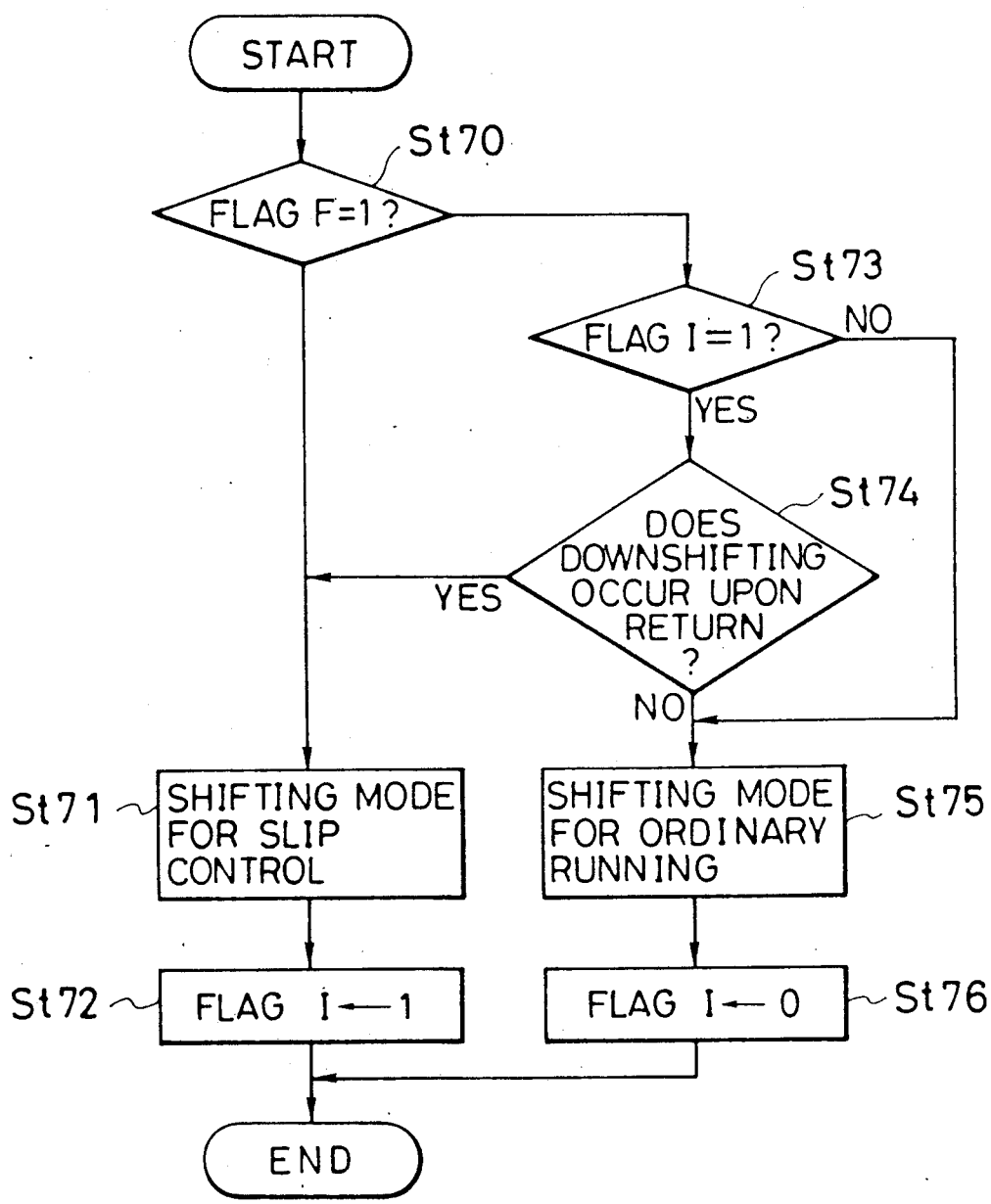
FIG. 8 is a flowchart showing one example of changing shift characteristics relating to the second embodiment according to the present invention.

Referring to FIGS. 5(a), 5(b) and 6, a description will be made on operation of the slip control using the apparatus according to the present invention.

When it is determined at St11 that the traction switch 117 is turned on to allow slip control, the procedures from St12 to St20 are executed to make a preliminary determination of the degree of slippage of the driven wheel and of the friction coefficient, μ, on pavement. Then procedures from St31 to St33 are executed to measure the friction coefficient μ on pavement. Procedures from St 41 to 51 are then implemented to compute a target throttle opening degree THo based on the determined degree of slippage. In other words, as will be described more in detail, if the degree of slippage is large, i.e., when SPIN=0, or if its degree is medium, i.e., when SPIN=100, the slip control is carried out. When the degree of slippage is small, i.e., when SPIN=255, or when no slippage occurs, ordinary control is carried out.

The specific control operation will then be described with reference to FIG. 6.

(a) From time T1 to T2:

At St12, it is determined that a large degree of slippage occurs on the driven wheel when the difference between the rotational velocity of the driven wheel, N1, and a rotational velocity of the undriven wheel, N2, becomes larger than a given value at time T1 and, at St19, "0" is given in register SPIN indicative of a degree of slippage. Then at St20, a time of 500 msec is set in timer register T1 and the velocity of the undriven wheel, N2, is set in register N. Then the increment ΔN of the number of revolutions of the undriven wheel during the time period of 500 msec is computed and a friction coefficient, μ, on pavement is calculated as a value MU from the increment ΔN and the velocity of the undriven wheel, N2 (procedures from St31 to St33). Thereafter, at St 45, a target number of revolutions, No, is computed on the basis of MU as the presumed friction coefficient, μ. The flow then proceeds to St46 where it is determined whether or not register SPIN=0. If SPIN=0, i.e., if it is determined that a large degree of slippage occurs, the flow proceeds to St47 where a degree of opening of the throttle valve is computed from the velocity N2 of the undriven wheel. In computation of the throttle opening degree at St47, an upper limit of the throttle opening degree is set and the throttle opening degree against the same amount of operation of the accelerator is set at a lower level as compared with the state in which no slippage occurs. The computed throttle opening degree THn is set as a target throttle opening degree THo at St51 so as to allow a degree of opening of the throttle valve, TH, to reach this value. In other words, a value for the throttle opening degree TH is set low during the slip control between times T1 and T2 in FIG. 6. It is noted that flag F shown at St42 is to indicate whether to be in the process of the slip control in which flag F=1 is intended to mean "slip control in progress" while flag F=0 is intended to mean "no slip control in progress".

(b) From time T2 to T3:

Since the throttle opening degree is set low as has been described hereinabove, at St14, 330 msec is set in timer register T2 as a degree of slippage on the driven wheel is reduced to a medium level at time T2 in FIG. 6 and it is determined that SPIN=0 at St13. Then at St16, "100" is set in register SPIN indicative of the degree of slippage. Thereafter, a friction coefficient μ on pavement is determined in substantially the same manner as above, and a target throttle opening degree THo is then determined on the basis of the velocity N2 of the undriven wheel at the time when the time set in the timer register T2, i.e., 330 msec, has elapsed. Thereafter, at St49, the throttle opening degree TH is regulated so as to amount to this value. The throttle opening degree at this time is set to be at a value in between the control from time T1 to time T2 and the control at the time of ordinary running.

At some period during the period from time T1 to T3, the shift characteristics are set in a slip control mode as will be described hereinbelow and the shift control for the automatic transmission is carried out on the basis of the shift patterns shown in FIG. 4.

(c) After time T3:

After 330 msec set in the timer register T2 has passed by, the content of the register SPIN is set at "225" at St17. Then at St50, in order to allow this value to amount to a throttle opening degree computed on the basis of the velocity N1 of the driven wheel, an actual throttle opening degree is subjected to feedback control.

The feedback control will now be briefly described. In this embodiment, as a target number of revolutions, Vo, there is set a value obtained by adding the number of revolutions of spin, $\Delta V$, set in accordance with the friction coefficient $\mu$ on pavement, i.e., MU, to the number of revolutions of the undriven wheel, FW. In order to control the actual number of revolutions by this target number Vo of revolutions thereof, the throttle opening degree THo is subjected to feedback control in the PI−P system as will be indicated by the following formula:

$$THo = STAG + P1(ENWR + ENWR1) + I \cdot ENWR - D[(PRWR - PRWR1) - (PRWR1 - PRWR2)] - P2(PRWR - PRWR1)$$

where
  STAG represents a target throttle opening forward by one control cycle;
  PRWR represents the current rotational velocity of the driven wheel;
  PRWR1 represents the rotational velocity of of the driven wheel forward by one control cycle;
  PRWR2 represents the rotational velocity of of the driven wheel forward by two control cycles;
  ENWR represents the difference between a target rotational velocity and the current rotational velocity of the driven wheel PRWR;
  ENWR1 represents such a difference forward by one control cycle;
  P1 represents a proportional gain producing an effect upon responsiveness;
  I represents an integral gain relating to stability;
  P2 represents a proportional gain responsive to a gain change for vehicles and so on; and
  D represents a differential gain responsive to a gain change of vehicles and so on.

In the PI−PD control system, follow-up performance to the target and stability are ensured by P1·I and the stability against outside turbulence, such as a change of characteristics for a throttle valve or a vehicle which is the object for control, can be compensated.

The slip control is suspended when the accelerator pedal is released (at St41) or when a degree of slippage is reduced as represented by St43 (SPIN=255), and the throttle opening degree is set in accordance with the depressing of the accelerator pedal at St53 after resetting flag F at St52. In other words, the throttle valve 105 is to have a degree of opening which substantially corresponds to the amount by which the accelerator pedal is depressed.

CHANGE CONTROL OF SHIFT CHARACTERISTICS (FIG. 7)

The shift characteristics of the automatic transmission 2 differ between those for ordinary running (FIG. 3) and those for slip control (FIG. 4). The change of the shift characteristics, in other words, the change from a shifting mode for slip control to a mode for ordinary running after completion of the slip control, is executed in accordance with the following procedures.

At St60, it is determined whether flag F=1 (whether the slip control is in progress). If it is determined flagF=1, i.e., that the slip control is in progress, the flow proceeds to St61 where the shifting mode for slip control (FIG. 4) is set and then at St62, flagI is set (flagI=1). FlagI=1 signifies the shifting mode for the slip control, and flagI=0 signifies the shifting mode for ordinary running.

As the slip control terminates, flagF=0 at St52 (FIG. 5) so that the flow proceeds from St60 to St63 where it is determined whether to be flagI=1. If the shifting mode is not changed yet, flagI=1 (shifting mode for the slip control) so that the flow proceeds to St64 where it is determined whether or not the accelerator pedal is depressed. If it is determined that the accelerator pedal is depressed, i.e., that it is in an ON state, on the one hand, the flow proceeds to ST61. If NO at St64, namely, if it is determined that the accelerator pedal is released, the flow proceeds to St65 where the shifting mode for ordinary running (FIG. 3) is set herein for the first time. Thereafter at St66, flagI is reset. In other words, even if the slip control is terminated, the shifting mode for the slip control is not changed immediately to the shifting mode for ordinary running. The change to the shifting mode for ordinary running is carried out initially on the condition that the stepping of the accelerator pedal 110 is released. Accordingly, recurrence of a large degree of slippage attendant upon downshifting can be prevented even if the downshifting would be caused on account of the change of the shifting modes, namely, the change to the shifting mode for ordinary running, because the accelerator pedal 110 is in a state in which it is not depressed very much, i.e., in which the torque generated by the engine is small.

SECOND EMBODIMENT (FIG. 8)

This embodiment is directed to the control over the change of the shifting modes on the basis of determination at St74 as to whether to cause downshifting. More specifically, even if the slip control were terminated (flagF=0), the shifting modes are not changed immediately after terminated. It is first determined at St74 whether or not the change from the shifting mode for the slip control (FIG. 4) to the shifting mode for ordinary running (FIG. 3) causes downshifting. If the determination at St74 leads to the conclusion that the change of the shifting modes causes no downshifting, then the flow eventually proceeds to St75 where the change to the shifting mode for ordinary running is made.

THIRD EMBODIMENT

FIGS. 10 to 19 are directed to a third embodiment of the apparatus according to the present invention. In this embodiment, the slip control is carried out by braking the driven wheels in addition to the output control of the engine. Shift characteristics for this third embodiment are designed such that the shift characteristics for ordinary running where no slip control is implemented is set using a throttle opening degree and a vehicle speed (the rotational velocity of the driven wheel or the rotational velocity of the undriven wheel may be used in either case) as parameters, as shown by the dashed lines in FIG. 19, while the shift characteristics for slip control are set using a vehicle speed as a parameter, as shown by the various solid lines in FIG. 19.

Figure 10:
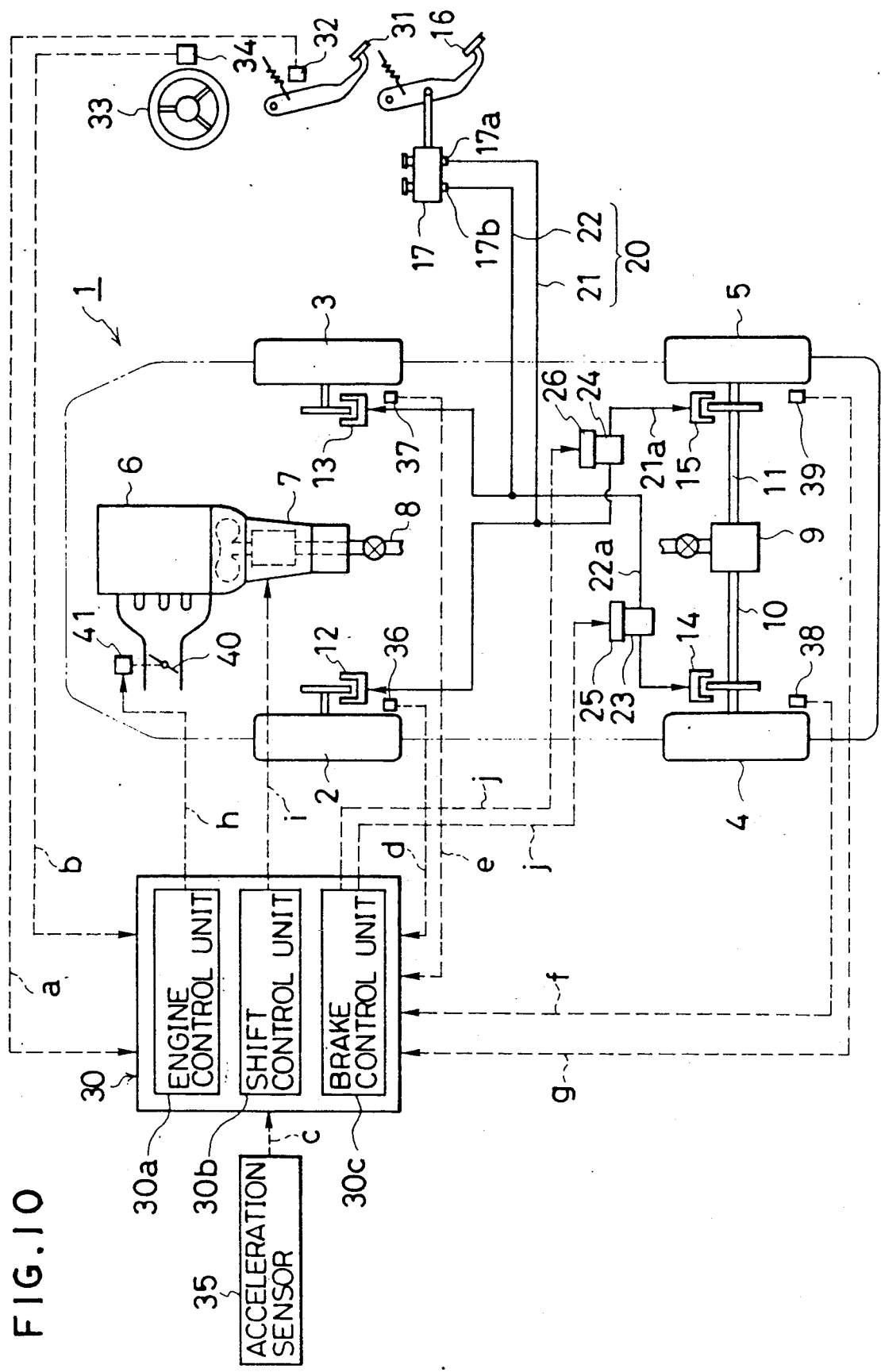

As shown in FIG. 10, a vehicle 1 is provided with left-hand and right-hand front wheels 2 and 3 for undriven wheels and left-hand and right-hand rear wheels 4 and 5 as driven wheels, respectively. The output of an engine 6 is transmitted to the driven rear wheels 4, 5 through an automatic transmission 7, a drive shaft 8, a differential 9 and left-hand and right-hand driving shafts 10 and 11, respectively. The undriven front wheels 2, 3 and the driven rear wheels 4, 5 are provided, respectively, with brake units 12, 13, and 14, 15, each of which comprises a disk rotor integrally rotatable with the wheel and a caliper for braking the rotation of the disk rotor when a braking pressure is fed. To each of the brake units 12 to 15 is fed through a brake system 20 a braking pressure generated by a master cylinder 17 when a braking pedal 16 is depressed, thus providing each of the wheels 2 to 5 with a braking force in accordance with the braking pressure. The brake system 20 comprises a first system section 21 connected to a first outlet 17a of the master cylinder 17 and a second system section 22 connected to a second outlet 17b thereof, in which the first system section 21 leads to the brake unit 12 for the left-hand front wheel 2 and the brake unit 15 for the right-hand rear wheel 5 while the second system section 22 leads to the brake unit 13 for the right-hand front wheel 3 and the brake unit 14 for the left-hand rear wheel 4. A branch line 22a leading to the brake unit 14 for the left-hand rear wheel in the second system section 22 is provided with a braking pressure control valve 23 for controlling a supply of the braking pressure to the brake unit 14, on the one hand, and a branch line 21a leading to the brake unit 15 for the right-hand rear wheel in the first system section 21 is provided with a braking pressure control valve 24 for controlling the supply of the braking pressure to the brake unit 15. These control valves 23 and 24 are provided with actuators 25 and 26, respectively.

A control unit 30 is provided in the vehicle 1, which comprises an engine control unit 30a for controlling the output of the engine 6, a shift control unit 30b for controlling shift operation of the automatic transmission 7, and a brake control unit 30c for controlling the braking force to be applied to the driven rear wheels 4, 5 through the respective braking pressure control valves 23, 24 and actuators 25, 26. To the control unit 30 are fed a signal a from an accelerator opening degree sensor 32 for sensing an opening degree (an amount of stepping) of an accelerator pedal 31 stepped, a signal b from a steered angle sensor 34 for sensing a steered angle of a steering wheel 33, a signal c from an acceleration sensor 35 for sensing acceleration of the vehicle 1, and signals d, e, f, g from wheel velocity sensors 36, 37, 38, 39, respectively, for sensing the rotational velocity of the wheels 2 to 5.

The control unit 30 generates a throttle control signal h to an actuator 41 of a throttle valve 40 mounted on an exhaust passage of the engine 6 from the engine control unit 30a, generates a shift control signal i to the automatic transmission 7 from the shift control unit 30b, and generates brake control signals j, j to the respective actuators 25, 26 of the braking pressure control valves 23, 24 from the brake control unit 30c in response to the respective input signals a through g. This permits output control of the engine 6 in accordance with the accelerator opening degree during ordinary running and the shift control of the automatic transmission in according with the driving state. Furthermore, when slippage occurs on the driven wheels 4, 5, the slip control is carried out by controlling the output of the engine and the braking force to be applied to the driven rear wheels 4, 5, while the shift control of the automatic transmission 7 is carried out in order to ensure running stability during the slip control and at the time of terminating the slip control.

The construction of the braking pressure control valve 23, 24 and their respective actuators 25, 26 will be described more in detail with reference to FIG. 11. The braking pressure control valves 23, 24 comprise, respectively, cylinders 23a, 24a, pistons 23b, 24b inserted in the cylinders 23a, 24a, as well as volume-variable chambers 23c, 24c and control chambers 23d, 24d, into which the cylinders 23a, 24a are divided, and furthermore springs 23e, 24e mounted to urge the pistons 23b, 24b so as to increase the volume of the volume-variable chambers 23b, 24b. The branch line 21a for the first system 21 leading to the brake unit 15 for the right-hand rear wheel from the master cylinder 17 is designed to pass through the volume-variable chamber 24c while the branch line 22a for the second system 22 leading to the brake unit 14 for the left-hand rear wheel from the master cylinder 17 is designed to pass through the volume-variable chamber 23c. This arrangement permits the supply of braking pressure generated in the master cylinder 17 to the respective brake units 14 and 15 for the left-hand and right-hand rear wheels through the volume-variable chambers 23c and 24c. The pistons 23b and 24b are provided, respectively, with check valves 23f and 24f for closing off the inlet of the braking pressure to the volume-variable chambers 23c and 24c when the pistons 23b and 24b are moved by the braking pressure into the control chambers 23d and 24d in resistance to the springs 23e and 24e so as to decrease the volume of the volume-variable chambers 23c and 24c. When the branch lines 22a and 21a are blocked by the check valves 23f and 24f, respectively, braking pressures are generated in the volume-variable chambers 23c and 24c and then fed to the brake units 14 and 15.

The actuators 25 and 26 for operating the respective braking pressure control valves 23 and 24 comprise electromagnetic valves 25a and 26a for increasing pressures and electromagnetic valves 25b and 26b for decreasing pressures. The electromagnetic valves 25a and 26a are mounted, respectively, on control pressure supply lines 44 and 45 leading from an oil pump 42 to the control chambers 23d and 24d of the braking pressure control valves 23 and 24 through a relief valve 43. The electromagnetic valves 25b and 26b are mounted, respectively, on drain lines 46 and 47 leading from the control chambers 23d and 24d. The electromagnetic valves 25a, 26a and 25b, 26b are closed or opened by brake control signals j, j from the control unit 30 (the brake control unit 30c in FIG. 2). The braking pressure to be fed to the brake units 14, 15 is increased, on the one hand, by introducing the braking pressure into the control chambers 23d, 24d of the braking pressure control valves 23, 24 when the electromagnetic valves 25a, 26a for increasing pressures are opened and the electromagnetic valves 25b, 26b for decreasing pressures are blocked, respectively. The braking pressure fed to the brake units 14, 15 is decreased, on the other hand, by withdrawing the braking pressure from the control chambers 23d, 24d thereof when the electromagnetic valves 25a, 26a are blocked and the electromagnetic valves 25b, 26b are opened, respectively. This construction permits control over the braking pressures to be applied to the brake units 14 and 15, in other words, to the respective driven wheels 4 and 5.

Operation of the control unit 30 will be described with reference to a flowchart in FIG. 12.

Figure 13:
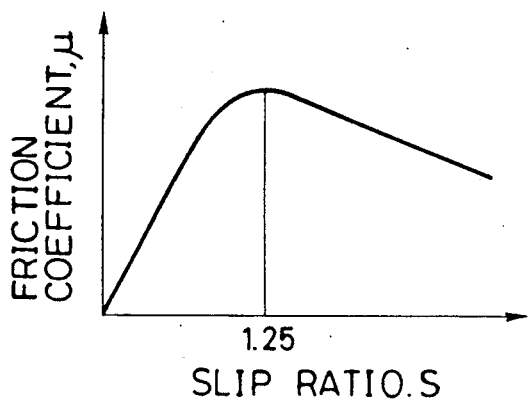

At S1, the value of traction flag (slip flag) $F_{TRC}$ is determined. The value of traction flag $F_{TRC}$ is set at "0" during ordinary running while it is set at "1" during the slip control. During ordinary running, the flow proceeds to S2 where it is determined whether or not slippage occurs on the driven wheels 4 and 5. If it is determined that no slippage occurs, is set to "3" flag $F_{AT}$ for the shift control at step S3. Then the throttle control of the engine 6 during ordinary running is executed at S4 and the shift control of the automatic transmission 7 is carried out at S5. Determination of the occurrence of slippage at S2 is carried out by comparing a slip ratio S with a set value So, in which the slip ratio S is the ratio of the number of revolutions (Wd) of the driven (rear) wheels 4, 5 to the number of revolutions (Ws) of the undriven (front) wheels 2, 3, (Wd/Ws). As the set value So is used a slip ratio (for example, 1.25) which provides the maximum friction coefficient, this is because the $\mu - S$ characteristics indicative of the relationship of a friction coefficient $\mu$ on pavement with the slip ratio S are generally given as shown in FIG. 13.

Figure 14:
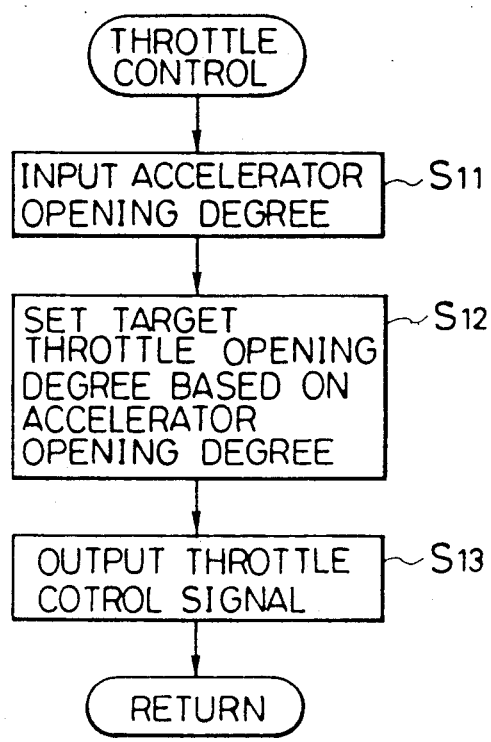
Figure 15:
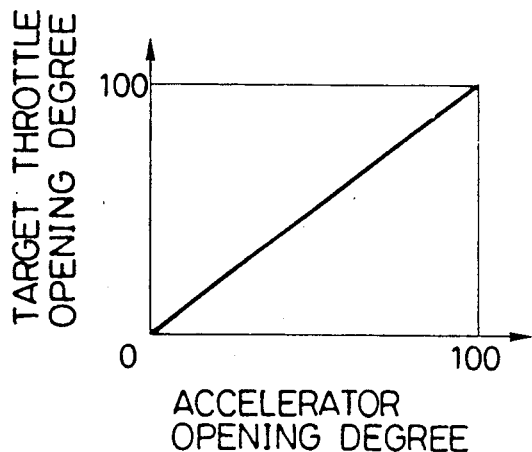

The throttle control at the time of ordinary running at S4 is carried out in accordance with the flowchart as shown in FIG. 14. At S11, the degree of opening of the accelerator is input and, at S12, a target throttle opening degree corresponding to the degree of opening of the accelerator, or the accelerator opening degree, is read from a preset map as shown in FIG. 15. At S13, the throttle control signal h is given to the actuator 41 as shown in FIG. 10 so as to reach the target throttle opening degree. This provides an accelerator opening degree, i.e., an engine output in accordance with the requirements of the driver.

Figure 12:
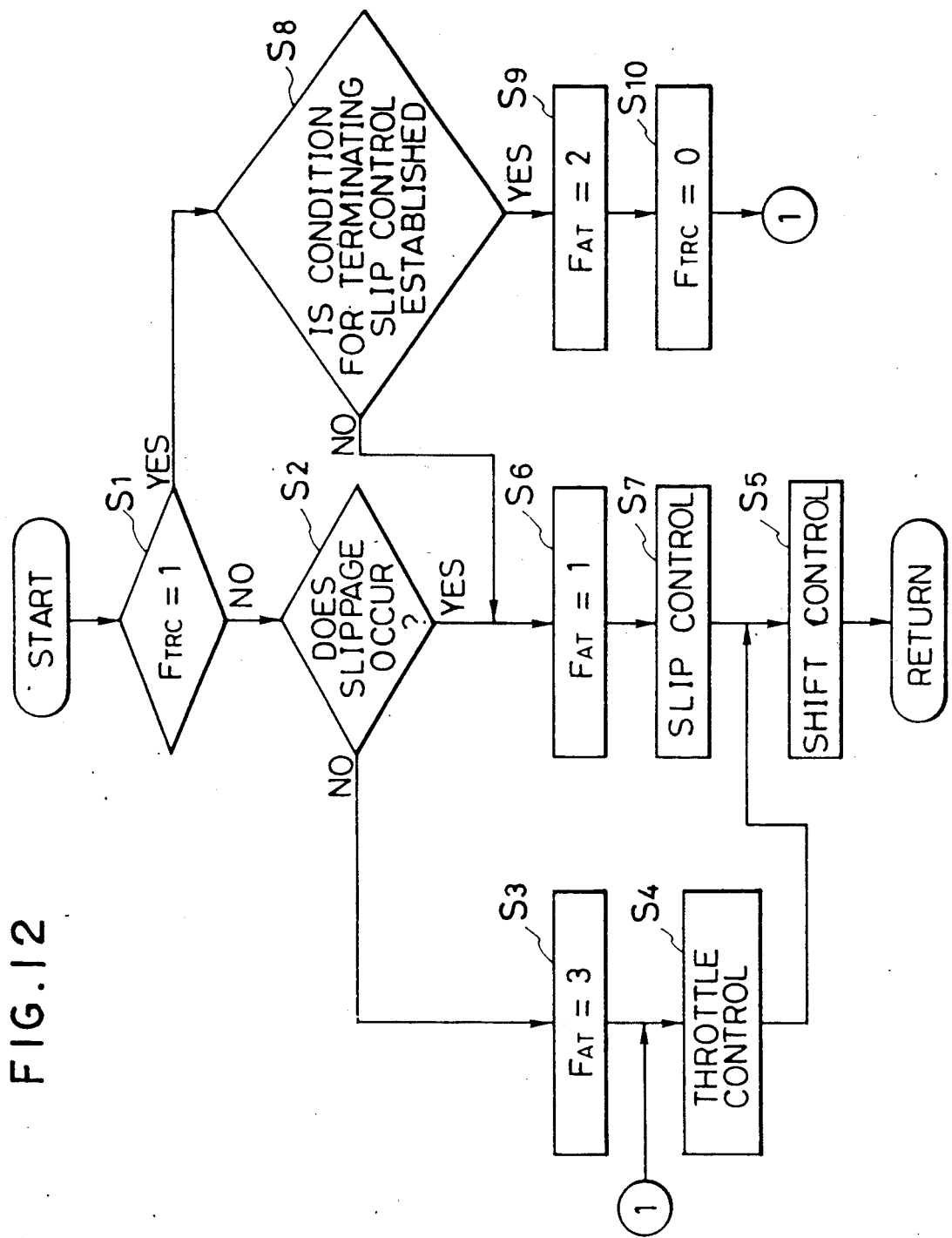

If a slippage occurs on the driven wheels 4 and 5 in the state of ordinary running, the control unit 30 executes procedures from S2 through S6 and S7 to S5 in FIG. 12. Then flag $F_{AT}$ for slip control is set at "1", then executing the slip control and shift control as will be described more in detail hereinbelow.

In the slip control, traction flag $F_{TRC}$ is set at "1" as has been described hereinabove so that procedures from S1 to S8 are executed where it is determined whether or not the termination condition of slip control is established. Until this termination condition has been established, slip control S7 is continued. As the termination condition is reached, then the procedures from S8 through S9 to S10 are executed and, at S9, flag $F_{AT}$ for the shift control is set at "2" and the traction flag $F_{TRC}$ is reset at "0". Then the procedures are returned to the ordinary throttle control by S4 and shift control by S5.

Figure 17:
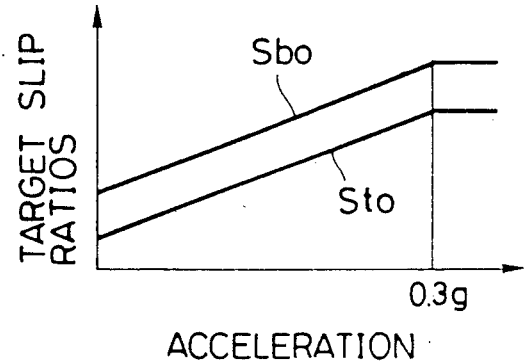
Figure 16:
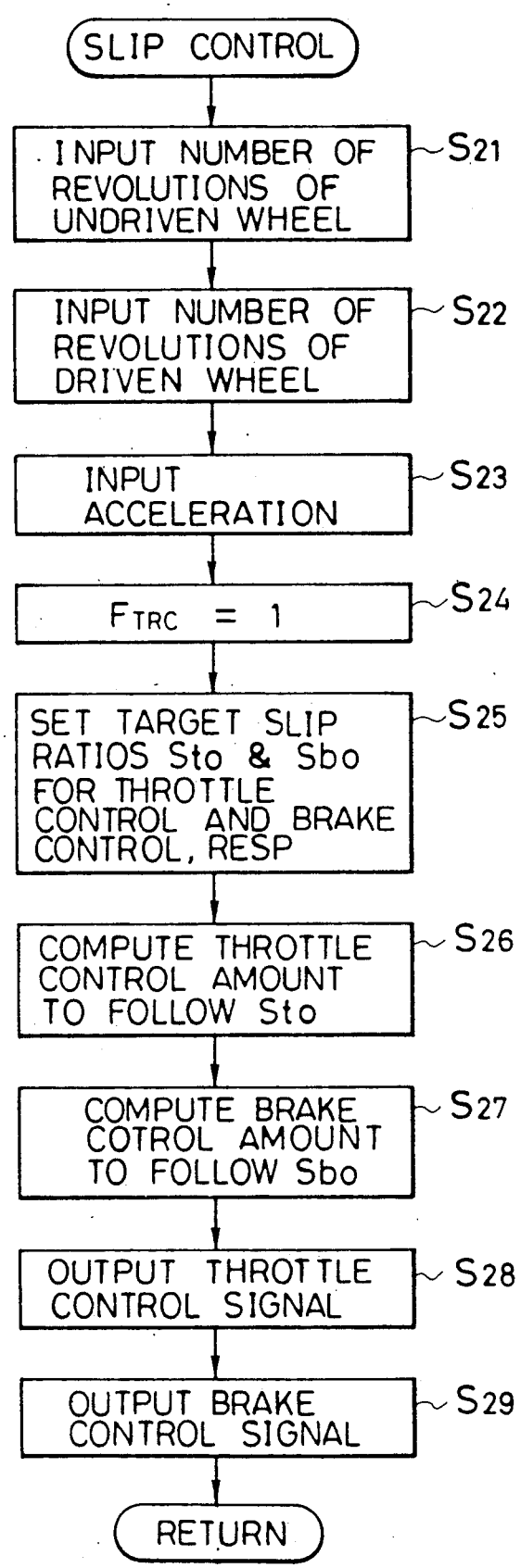

A sub-program for the slip control at S7 will be described in accordance with the flowchart in FIG. 16. At S21, the numbers of revolutions of the undriven wheels 2 and 3 are input as signals d and e from the sensors 36 and 37 in FIG. 10 and, at S22, the numbers of revolutions of the driven wheels 4 and 5 are input as signals f and g from the sensors 38 and 39 in FIG. 10, respectively. Furthermore, at S23, acceleration of the vehicle 1 is input as signal c from the sensor 35. Thereafter, at S24, the traction flag $F_{TRC}$ is set at "1" for carrying out the slip control. Then at S25, a target slip ratio Sto for the throttle control and a target slip ratio Sbo for the brake control are set on the basis of a map indicative of one example as shown in FIG. 17 in accordance with the amount of acceleration at the time of occurrence of slippage of the driven wheels 4 and 5. The flow then proceeds to S26 where a throttle control amount is computed so as to follow the target slip ratio Sto for the throttle control. More specifically, a control amount of the throttle control signal h is computed, and a signal is then generated at S28 to the actuator 41 of the throttle valve 40 to follow the target slip ratio Sto. Then at S27, a brake control amount is computed so as to follow the target slip ratio Sbo for the brake control. In other words, the control amount of the brake control signals j, j is computed, which in turn are provided at S29 to the actuators 25 and 26 of the respective braking pressure control valves 23 and 24.

Figure 11:
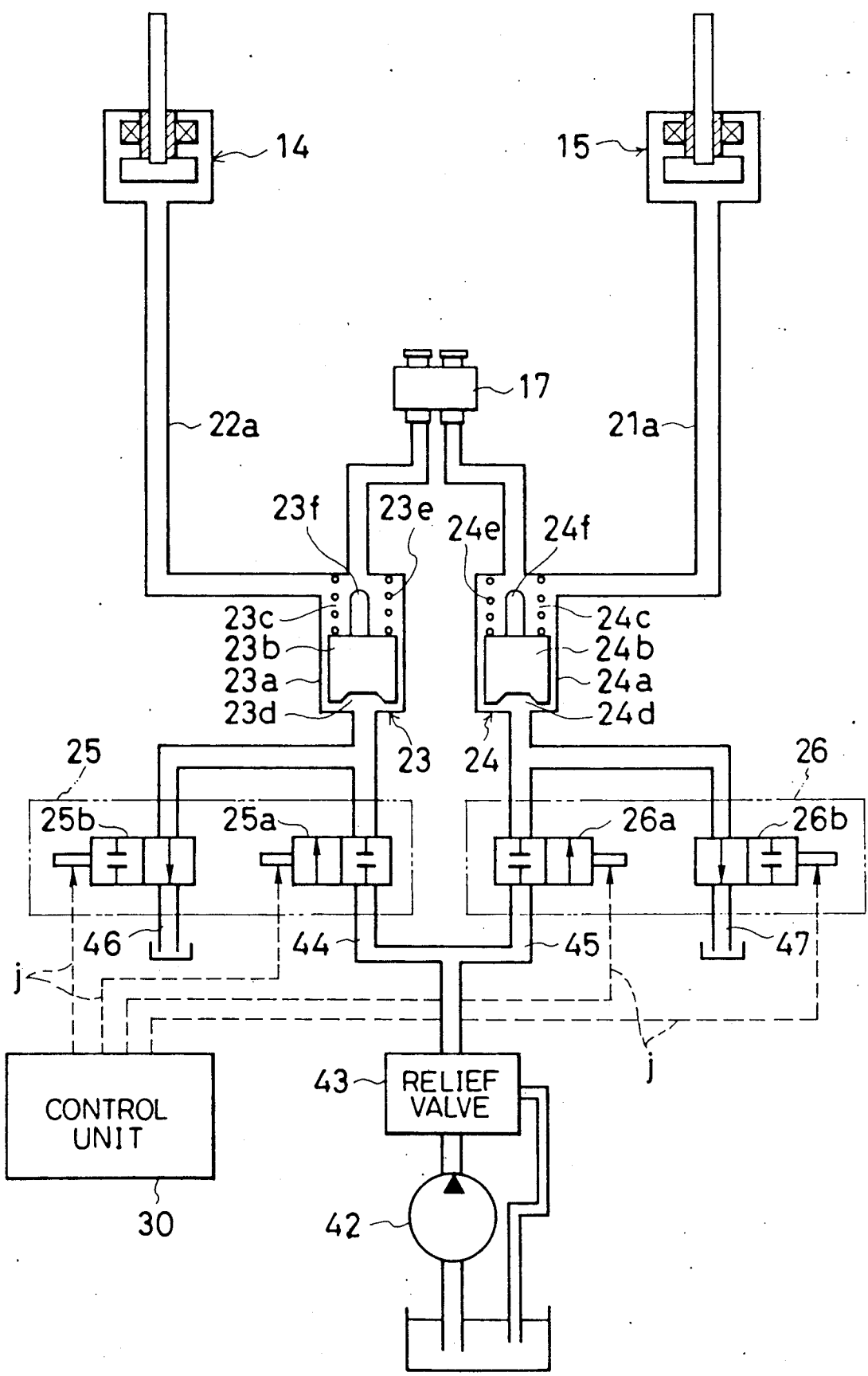

If the driven wheels 4 and 5 slip, the opening degree of the throttle valve 40 is controlled so as to decrease the output of the engine 6, and the brake units 14 and 15 are operated through the braking pressure control valves 23 and 24, as shown in FIG. 11, to apply braking pressure to the driven wheels 4 and 5, thus decreasing the driving force of the driven wheels 4 and 5 and, as a consequence, causing the slippage of the driven wheels 4 and 5, respectively, to decrease and equalize. In this case, as shown in FIG. 17, the target slip ratios Sto and Sbo are set at a lower level so as to enable an effective control over slippage when acceleration is very small, in other words, when the friction coefficient, $\mu$, on pavement is very small. Furthermore, the target slip ratio Sto for the throttle control is set so as to become smaller than the target slip ratio Sbo for the brake control so that the brake control can be carried out only when the slip ratio S is large at an initial stage of slippage occurred. Furthermore, the target slip ratios Sto and Sbo are corrected at cornering in accordance with the signal b from the steered angle sensor at S25 as shown in FIG. 17.

Slip control terminates when the accelerator opening degree becomes "0" (fully closed), where there is no risk of slippage of the driven wheels 4 and 5, and when the throttle opening degree by the throttle control as slip control becomes equal to the throttle opening degree corresponding to the accelerator opening degree during ordinary running. These end conditions are used for determination of the end of the slip control at S8 in the main program.

As has been described hereinabove, the present invention permits a regulation of slippage of the driven wheels 4 and 5 by the slip control and an effective utilization of the driving force as a thrust for the vehicle. And the shift control of the automatic transmission 7 is carried out in accordance with the flowchart as shown in FIG. 18 so as to be suited for the slip control.

Figure 18:
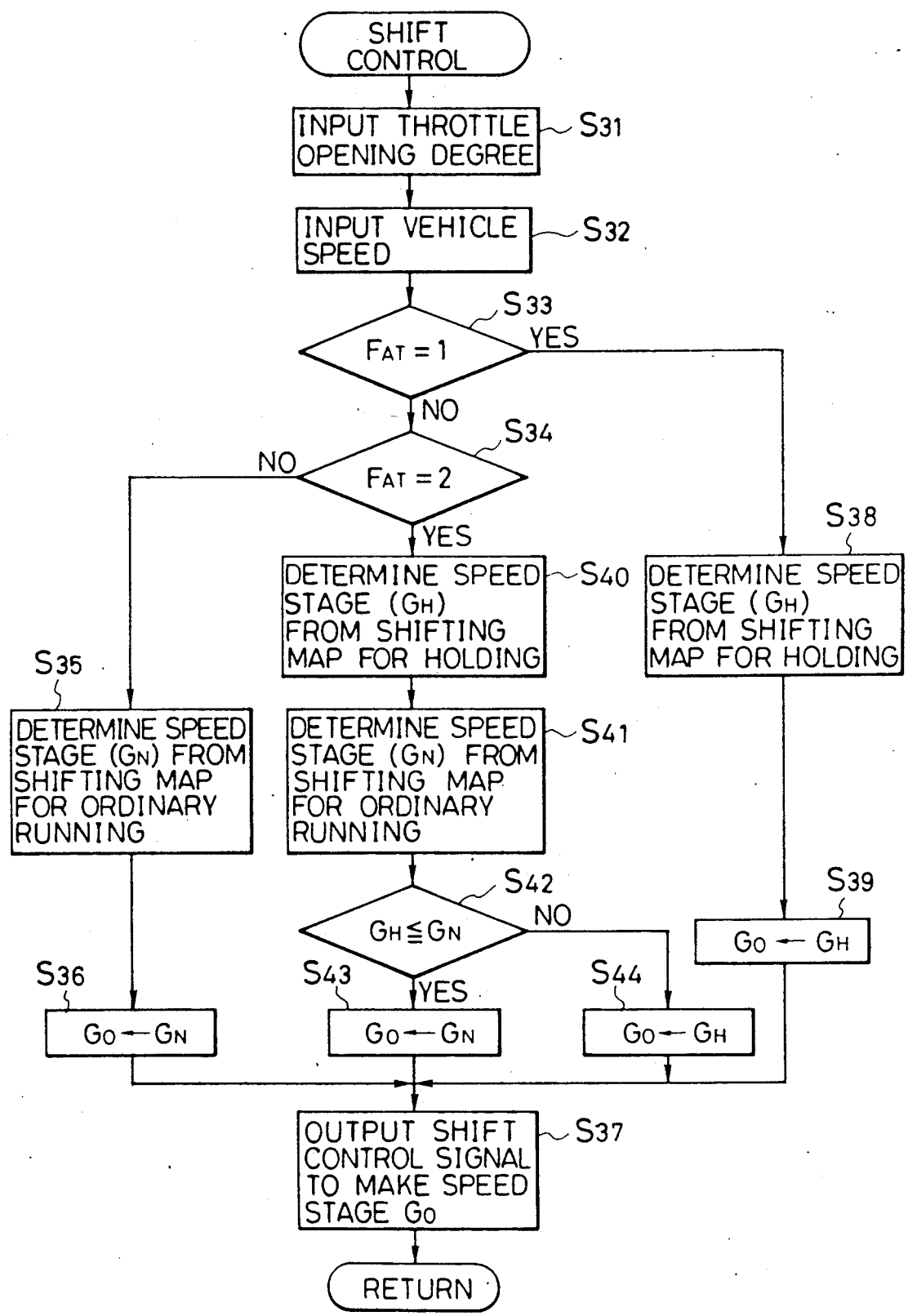

In this control as shown specifically in FIG. 18, the throttle opening degree and the vehicle speed are entered at S31 and S32, respectively. In this case, the throttle opening degree is a value set on the basis of the accelerator opening degree in the throttle control as shown in FIG. 14 during ordinary running and a value set so as to reach the target slip ratio Sto during slip control as shown in FIG. 16. The vehicle speed is computed on the basis of the numbers of revolutions of the undriven wheels 2 and 3.

Then at S33, flag $F_{AT}$ for the shift control set in the main program in FIG. 12 is examined to determine whether or not its value is "1". If the value is "3", in other words, if NO at S33, then flow advances to S35 through S34 where it is determined whether or not flag $F_{AT}$ is "2". At S35, an optimum speed stage ($G_N$) involved in an actual running state is read from a shifting map for ordinary running and the flow goes to S36 where the optimum speed stage ($G_N$) is set as a target speed stage (Go). Thus the shift control at the time of ordinary running is carried out in the manner as has been described hereinabove. In other words, the actual running state represented as parameter by the throttle opening degree and the vehicle speed as given hereinabove is collated with a shifting map for ordinary running which comprises a plurality of shifting lines $L_N$ as shown by solid lines in FIG. 19 (where the case of downshifting only is described) and then the optimum speed stage $G_N$ suited for the running state at that time is found. Thereafter, the optimum speed stage $G_N$ is set as a target speed stage Go. At S37, the shift control signal i is generated to the automatic transmission 7 so as to give the target speed stage Go.

Figure 19:
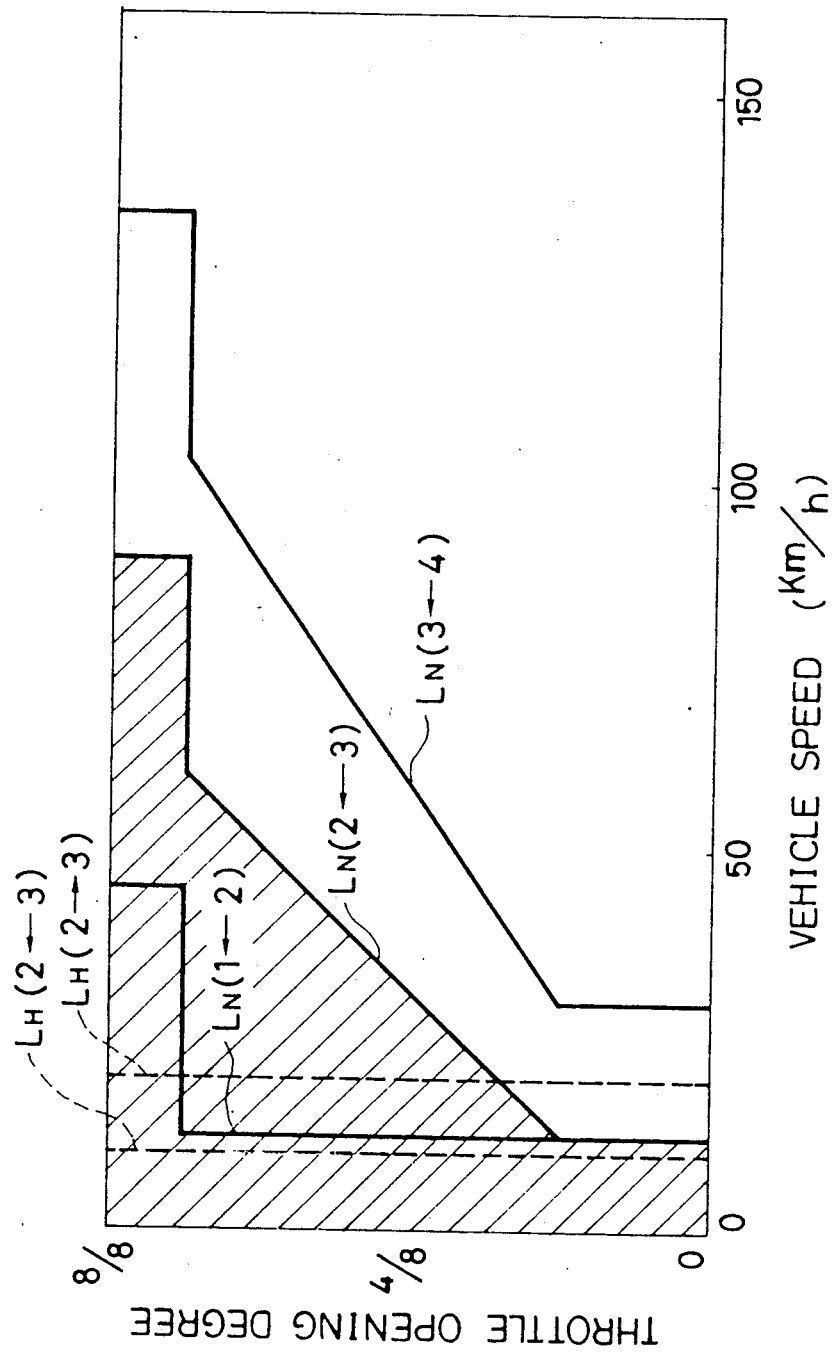

When it is determined at S2 of the main program as shown in FIG. 12 that slippage occurs and flag $F_{AT}$ for the shift control is set at "1", procedures from S33 to S38 in the flowchart as shown in FIG. 18 are executed where an optimum speed stage $G_H$ is read on the basis of a shifting map for holding shown by the dashed lines in FIG. 19. The shifting map for holding comprises shifting lines $L_H$ as the vehicle speed only so that the optimum speed stage $G_H$ is held against a variation in the throttle opening degree. More specifically, if it is determined that flag $F_{AT}$ is "1" at S33, the optimum speed stage $G_H$ is read from the shifting map for holding at S38 and the optimum speed stage $G_H$ is set to a target speed stage Go. Then at step S37, the shift control signal i is generated to the automatic transmission 7 so as to provide the target speed stage Go. This arrangement prevents speed stages from switching during the slip control even if the throttle opening degree would change by the slip control during the slip control for controlling slippage of the driven wheels 4 and 5, thus avoiding hunting of speed stages during the slip control.

When it is determined at S8 in the main program as shown in FIG. 12 that the slip control is to terminate and flag $F_{AT}$ is set at "2", procedures from S34 through S40 to S41 in the shift control as shown in FIG. 18 are executed. More specifically, an optimum speed stage $G_H$ for holding is read at S40 from the shifting map for holding constituted by the dash lines $L_H$ as shown in FIG. 19 and an optimum speed stage $G_N$ for ordinary running is given at S41 from the shifting map for ordinary running constituted by the solid lines $L_N$ as shown in FIG. 19. Then at S42, it is determined whether the optimum speed stage $G_H$ for holding is equal to or smaller than the optimum speed stage $G_N$ for ordinary running.

If it is determined at S42 that the optimum speed stage $G_H$ for holding is equal to or smaller than the optimum speed stage $G_N$ for ordinary running, on the one hand,—in other words, if it is determined that the speed stage ($G_H$) immediately after the conclusion of the slip control in such a state that the shifting is regulated during the slip control is at a speed stage lower than or equal to the speed stage ($G_N$) by the shift control for ordinary running in accordance with running state (throttle opening degree and vehicle speed) at the time of such ordinary running—the optimum speed stage $G_N$ given from the shifting map for ordinary running is adopted as a first target speed stage Go after termination of the slip control at S43 and the shift control signal i is generated to the automatic transmission 7 so as to provide the target speed stage Go. Accordingly, in this case, when the slip control has terminated, the speed stage of the automatic transmission 7 is upshifted or retained at the same speed stage.

If the optimum speed stage $G_H$ for holding is larger than the optimum speed stage $G_N$ for ordinary running, on the other hand—in other words, if the speed stage ($G_H$) in such a state that the shifting is regulated immediately after termination of the slip control is a speed stage higher than the speed stage ($G_N$) by the shift control during ordinary running and the downshifting is caused as the shift control is returned to a control for ordinary running at the time of termination of the slip control (if the speed stage is in an area as shown by oblique lines in FIG. 19)—the optimum speed stage $G_H$ given on the basis of the shifting map for holding during the slip control is adopted as a target speed stage Go. Then at S37, the shift control signal i is generated so as to provide the target speed stage $G_O$.

The above construction permits prevention of downshifting the automatic transmission 7 immediately after termination of the slip control and prevents the driven wheels 4 and 5 from re-slipping due to the downshifting, thus avoiding a re-execution of the slip control.

It is to be understood that the present invention is applicable to those modifications of embodiments as will be described hereinabove.

For a vehicle with a diesel engine which is designed to adjust output of the engine by adjusting an amount of fuel to be injected therein, the slip control may be carried out by controlling a member adjusting the amount of the fuel in addition to control of the throttle valve. Furthermore, in this case, there may be used as shift characteristics an amount of operation of the member for adjusting the amount of the fuel injected, in place of the throttle opening degrees as shown in FIGS. 3 and 19.

As a condition for terminating the slip control may be used the condition that the actual throttle opening degree is smaller than the target throttle opening degree obtainable in the light of the basic throttle characteristics as shown in FIG. 9 or FIG. 14.

It is to be understood that the present invention may be embodied in other specific forms without departing from the spirit and scope thereof. The present embodiments are therefore to be considered in all respects as illustrative and not restrictive, the scope of the invention being indicted by the appended claims, and all the changes, modifications and variations which come within the meaning and range of equivalency of the claims are therefore intended to be encompassed within the spirit and scope of the invention.

What is claimed is:

1. A power train control apparatus for a vehicle comprising a combination of one or more microprocessors having a memory with programs stored therein for carrying out power train control functions and associated apparatus adapted to transmit output of an engine to a driven wheel through an automatic transmission for shifting speed stages based on a given shift characteristic, said combination comprising:

a slip detecting means for detecting a slip value of the driven wheel on pavement;

a slip control means for controlling the degree of slippage by reducing torque to be applied to the driven wheel in response to output from said slip detecting means when a degree of slippage is large enough to be reduced by slip control;

a shift-characteristics changing means for changing said given shift characteristic, said shift characteristic comprising a first shift characteristic and a second shift characteristic, in a manner such that said first shift characteristic is used at the time of ordinary running when no slip control is carried out by said slip control means and said second shift characteristic is used when slip control is carried out by said slip control means;

a running-state detecting means for detecting a given preset vehicle running state; and a regulation means for regulating return of said second shift characteristic to said first shift characteristic when said given preset running state is detected by said running-state detecting means as slip control by said slip control means terminates.

2. A power train control apparatus as claimed in claim 1, wherein said second shift characteristic has a range in a high speed stage, which is wider than said first shift characteristic.

3. A power train control apparatus as claimed in claim 1, wherein said given running state is set at a time when torque generated by the engine is large.

4. A power train control apparatus as claimed in claim 1, wherein said given running state is set at a time when a speed stage is downshifted upon return to said first shift characteristics.

5. A power train control apparatus as claimed in claim 1, wherein said given running state is set at a time when an accelerator is opened or when a degree of opening of accelerator is not zero.

6. A power train control apparatus as claimed in claim 1, wherein:

the output, or the torque generated thereby, is adjusted by an amount of intake air adjusted by a degree of opening of a throttle valve; and said slip control implements slip control by controlling said degree of opening of the throttle valve regardless of operation of accelerator.

7. A power train control apparatus as claimed in claim 6, wherein:

said first shift characteristic is set using said degree of opening of the throttle valve and a number of revolutions of the driven wheel as parameters; and said second shift characteristic is set using said degree of opening of the accelerator and a number of revolutions of the undriven wheel as parameters.

8. A power train control apparatus as claimed in claim 6, wherein said second shift characteristic is set so as to cause no shifting even when said degree of opening of the throttle valve changes.

9. A power train control apparatus as claimed in claim 8, wherein said second shift characteristic is set using a vehicle speed only as a parameter.

10. A power train control apparatus as claimed in claim 6, wherein:

a throttle characteristic for slip control is preset, in which a target degree of opening of the throttle valve in accordance with a vehicle speed is stepwise set using a friction coefficient on pavement as a parameter; and said slip control is implemented by providing a target throttle opening degree by collating the vehicle speed and the friction coefficient with said throttle characteristic for slip control and making said degree of opening of the throttle valve said target throttle opening degree.

11. A power train control apparatus as claimed in claim 1, wherein said slip value is determined on the basis of a rotational velocity of the driven wheel and a rotational velocity of the undriven wheel.

12. A power train control apparatus as claimed in claim 11, wherein said slip value is a difference obtained by subtracting the rotational velocity of the undriven wheel from the rotational velocity of the driven wheel.

13. A power train control apparatus as claimed in claim 11, wherein said slip value is set as a ratio of the rotational velocity of the driven wheel to the rotational velocity of the undriven wheel.

14. A power train control apparatus comprising a combination of one or more microprocessors having a memory with programs stored therein for carrying out power train control functions and associated apparatus, said combination comprising:

an output adjusting means for adjusting output of an engine, or torque generated by the engine;

an automatic transmission for effecting shifting on the basis of a given shift characteristic, which is interposed between said engine and driven wheels;

a first rotational velocity detecting means for detecting a rotational velocity of a driven wheel;

a second rotational velocity detecting means for detecting a rotational velocity of an undriven wheel;

a slip value determining means for determining a slip value against the driven wheel on pavement on the basis of the rotational velocity of the driven wheel and the rotational velocity of the undriven wheel in response to output from said first and second rotational velocity detecting means, respectively;

a slip control means for reducing torque applied to the driven wheel by controlling said output adjusting means prior to operation of an accelerator when the slip value determined by said slip ratio determining means is larger than a predetermined value;

a shift characteristic changing means for changing said given shift characteristic comprising a first shift characteristic and a second shift characteristic so as to set said first shift characteristic at the time of ordinary running when no slip control is carried out by said slip control means and to set said second shift characteristic at a setting which is least unlikely to cause downshifting compared with said first shift characteristic when slip control is carried out by said slip control means;

a running-state detecting means for detecting a given running state in which a running state of the vehicle is preset; and a regulation means for regulating return of said shift characteristic from said second shift characteristic to said first shift characteristic when said given running state is detected by said running-state detecting means as the slip control by said slip control means terminates.

15. A power train control apparatus as claimed in claim 14, wherein:

said first shift characteristic is set using an amount of operation of said output adjusting means and a rotational velocity of a driven wheel as parameters; and said second shift characteristic is set using an amount of operation of an accelerator and a rotational velocity of an undriven wheel as parameters.

16. A power train control apparatus as claimed in claim 14, wherein:

said first shift characteristic is set using an amount of operation of said output adjusting means and a vehicle speed as parameters; and said second shift characteristic is set using a vehicle speed only as a parameter.

17. A power train control apparatus as claimed in claim 14, wherein said given running state is set when the accelerator is set, or when a degree of operation of an accelerator is not zero.

18. A power train control apparatus as claimed in claim 14, wherein said given running state is set at the time when downshifting is effected as said given shift characteristic is returned to said first shift characteristic.

19. A power train control apparatus as claimed in claim 14, wherein said slip control means decreases torque applied to the driven wheel by braking the driven wheel as well as by controlling said output adjusting means.

20. A power train control apparatus as claimed in claim 19, wherein said slip control means controls said output adjusting means so as to make said slip value, or an actual rotational velocity of the driven wheel, a given first target value and to control a brake for said driven wheel so as to make said slip value, or said actual rotational velocity of the driven wheel, a given second target value.

21. A power train control apparatus as claimed in claim 20, wherein said first target value is set smaller than said second target value.

22. A power train control apparatus as claimed in claim 14, wherein said output adjusting means is a throttle valve for adjusting an amount of intake air of the engine.

23. A power train control apparatus comprising a combination of one or more microprocessors having a memory with programs stored therein for carrying out power train control functions and associated apparatus, said combination comprising:

an engine whose output or amount of torque generated can be regulated by adjustment of an amount of intake air by adjusting a degree of opening of a throttle valve;

an automatic transmission for effecting shifting on the basis of a given shift characteristic, which is interposed between said engine and driven wheels;

a first rotational velocity detecting means for detecting a rotational velocity of a driven wheel;

a second rotational velocity detecting means for detecting a rotational velocity of an undriven wheel;

a slip value determining means for determining a slip value of the driven wheel on pavement on the basis of the rotational velocity of the driven wheel and the rotational velocity of the undriven wheel in response to output from said first and second rotational velocity detecting means, respectively;

a slip control means for reducing torque applied to the driven wheel by controlling said throttle valve prior to operation of an accelerator when the slip value determined by said slip value determining means is larger than a predetermined value;

a shift characteristic changing means for changing said given shift characteristic comprising a first shift characteristic and a second shift characteristic so as to set said first shift characteristic at the time of ordinary running when no slip control is carried out by said slip control means and to set said second shift characteristic at a setting which is least unlikely to cause downshifting compared with said first shift characteristic when slip control is carried out by said slip control means;

a speed stage comparing means for comparing a first speed stage obtainable on the basis of said first shift characteristic with a second speed stage obtainable on the basis of said second shift characteristic when slip control by said slip control means terminates; and a shift characteristic return regulating means for regulating return of said shift characteristic from said second shift characteristic to said first shift characteristic when said first speed stage is lower than said second speed stage by means of said speed stage comparing means.

24. A power train control apparatus as claimed in claim 23, wherein:

said first shift characteristic is set using engine load and vehicle speed as parameters; and said second shift characteristic is set using vehicle speed alone as a parameter.

* * * * *